Patented Nov. 27, 1945

2,389,924

UNITED STATES PATENT OFFICE 2,389,924

LOW TEMPERATURE LUBRICANTS

John D. Morgan, South Orange, N. J., assignor to Cities Service Oil Company, New York, N. Y., a corporation of Pennsylvania No Drawing. Application September 16, 1942, Serial No. 458,565

7 Claims. (Cl. 252—41)

This invention relates to improvements in the method of lubricating metallic bearing surfaces of various types of mechanisms at excessively low temperatures, and to an improved lubricant therefor.

More particularly, the improved lubricant is preferably comprised essentially of a single compound adapted to be an effective lubricant at extremely low temperatures of for example about 100° F. below freezing temperature, and also to be effective at high temperatures of the order of 100° or 200° F. Ordinary lubricating oils do not provide effective lubrication at such low temperatures or over such wide temperature ranges.

The need for lubricants of the type of the present invention is apparent from the fact that aircraft and other mechanisms are operated at widely different temperature within very short periods of time. For example, an aeroplane may take off at a ground temperature of 100° F. or 140° F. and within a matter of minutes be operating at temperatures of the order of minus 40° F. (72° F. below freezing) or lower. Other mechanisms must be used almost continuously at low temperatures, as for example motor vehicles used in the Arctic. Sometimes it is impossible to operate a mechanism in a frigid climate or under conditions of extreme cold until the bearings have been warmed artificially.

The primary object of the present invention is to provide an improved method for lubricating metal bearing surfaces and to provide a lubricant which will avoid difficulties such as described above and which are encountered in the use of ordinary lubricating oils.

The present invention includes the discovery that the picolines have the unique properties required for the lubrication of bearing surfaces over wide temperature ranges of the type referred to above, and particularly at extremely low temperatures, although it would not ordinarily be expected that a material which would be suitable as a lubricant at a temperature of minus 70° F. would also be satisfactory and have a satisfactory viscosity for lubrication purposes at temperatures of 100° F. or 200° F.

The picolines are particularly adapted for the lubrication of bearings in which heavy loads are not involved, although they may be used in extreme pressure lubrication if a small proportion of an extreme pressure agent is mixed therewith. The picolines are especially adapted for low temperature lubrication. Alpha picoline, the preferred compound, has the following properties:

| | |
|---|---|
| Viscosity at minus 40° F. (centistokes) | 3.06 |
| Viscosity at 0° F. | 1.97 |
| Viscosity at 100° F. | 0.76 |
| Viscosity at 200° F. | 0.52 |
| Melting point °F. | −94 |
| Boiling point °F. | 262 |
| Index of refraction at 16.7° C. | 1.50293 |
| Specific gravity | 0.950 |

The beta and gamma picolines have properties comparable with that of alpha picoline, the gravities and boiling points being somewhat higher. The picolines are colorless oils, soluble in water.

The improved lubricant, according to the present invention, may be applied directly to the bearings to be lubricated, in any suitable manner commonly used for the application of mineral lubricants, care being taken of course to avoid excessive loss and dilution of the lubricant because of the possible presence of water. One of a mixture of these compounds is preferably used in the substantial absence of other materials for the lubrication of mechanisms which do not have high bearing loads. However, the picolines may be used as a grease when thickened or jelled with a suitable thickening agent such as a soap. A suitable grease may be made from a sodium soap such as sodium stearate, oleate or sodium soaps of other suitable fatty acids. The grease may be made by incorporating from 4% to 20% of the sodium soap in one of the picolines or a mixture of two or more of the picolines. Up to the present time, it has been found impossible to make a grease with lithium, calcium or aluminum soaps. Where the grease is to be used under extreme pressure conditions or under conditions where extreme pressures are possible it should include from about 0.5% to 3% of an extreme pressure agent such as "Polane," tricresyl phosphate, sulfurized tricresyl phosphite, a sulfurized animal oil, or other suitable extreme pressure agent.

The picolines may also be made effective lubricants for safe lubrication under any load usually encountered with liquid lubricants by adding thereto a small proportion of one of the extreme pressure agents listed above. For example alpha picoline containing only 1% of 'Polane" or of sulfurized cresyl phosphite gave excellent results. In testing alpha picoline alone on the same lubricant testing machine mentioned above the compound was found useful only up to a load of about 350 lbs. gage, whereas the above mixtures containing the extreme pressure agents were found useful up to about 1000 lbs. gage load on the machine. Any suitable extreme pressure agent may be used and may comprise from about 0.5 to about 2% of the mixture.

The lubricant either when used alone, with an extreme pressure agent or in a grease composition may include an anti-corrosion agent such as tricresyl phosphite, triethanolamine or other known agent, especially where the bearings are considerably exposed to the action of air or other oxidizing or corrosive atmosphere.

While it is preferred to use one or a mixture of the picolines directly as essentially the only constituent of the lubricant, it has been found that its addition to motor oils has the unusual effect of greatly increasing load-carrying capacity of the oil. For example, a Pennsylvania motor oil of 30 SAE which produced an incipient seizure at 250 lbs. gage load on a lubricant testing machine, failed to show seizure until 650 lbs. gage was reached when it contained 3.2% of alpha picoline.

Effective low temperature lubricants may be made from the picolines in accordance with the present invention by blending one or more of them with other compounds. This may be found desirable for example when it is advisable to provide a lubricant having a definite viscosity curve over a specific relatively narrow temperature range. In making such blends, it is preferred that the mixture include a major part of one of the picolines while the remainder of the mixture may comprise decalin, tetralin, cumene, a chlorobenzene, a glycol, a carbitol, a lactate, an oxylate, a benzoate or a phthalate. All of these compounds have been found to possess certain advantageous properties for lubricating bearings at extremely low temperatures.

While the features of the present invention have been described and illustrated in connection with certain examples, it is to be understood that the invention is not to be restricted except in accordance with the scope of the prior art and of the appended claims.

Having described the invention in its preferred form what is claimed as new is:

1. A lubricant for metallic bearing surfaces having viscosity characteristics adapted to provide effective lubrication at extremely low temperatures as well as at temperatures above normal atmospheric temperature, consisting essentially of a picoline having dissolved therein a small proportion of an extreme pressure agent sufficient to impart extreme pressure properties to the lubricant.

2. A lubricant as defined by claim 1 consisting essentially of alpha picoline.

3. A lubricant as defined by claim 1 consisting essentially of beta picoline.

4. A lubricant as defined by claim 1 consisting essentially of gamma picoline.

5. A grease for lubricating metallic bearing surfaces comprising from about 4% to about 20% of a sodium soap and from about 96% to about 80% of a picoline, said soap being compatible with said picoline and adapted to thicken the same to produce a grease.

6. A grease as defined by claim 5 which also includes a small proportion of an extreme pressure agent.

7. A lubricating grease comprising a major proportion of a picoline and a substantial proportion of a sodium soap sufficient to thicken the picoline to produce a grease consistency.

JOHN D. MORGAN.